United States Patent [19]
Albrecht et al.

[11] Patent Number: 5,454,955
[45] Date of Patent: Oct. 3, 1995

[54] USE OF HECTORITE AS A CLARIFICATION AID FOR DEINK PLANT EFFLUENT

[75] Inventors: William E. Albrecht, Woodridge, Ill.; David W. Reed, Seattle; James H. Smith, Vancouver, both of Wash.

[73] Assignee: Nalco Chemical Company, Naperville, Ill.

[21] Appl. No.: 217,815

[22] Filed: Mar. 25, 1994

[51] Int. Cl.$^6$ .................................................. C02F 1/56
[52] U.S. Cl. .......................... 210/705; 210/714; 210/727; 210/728; 210/734; 210/736; 210/917; 210/928; 162/5
[58] Field of Search ................................. 210/666, 705, 210/714, 725, 727, 728, 735, 736, 917, 928, 734; 162/5

[56] References Cited

U.S. PATENT DOCUMENTS

| | | | |
|---|---|---|---|
| 5,013,456 | 5/1991 | St. John et al. | 210/734 |
| 5,151,155 | 9/1992 | Cody et al. | 162/5 |

FOREIGN PATENT DOCUMENTS

| | | | |
|---|---|---|---|
| WO93/02967 | 2/1993 | WIPO | 210/727 |
| WO93/02968 | 2/1993 | WIPO | 210/727 |
| WO93/02966 | 2/1993 | WIPO | 210/727 |

OTHER PUBLICATIONS

Paperchem No. 64–11794 Organophilic Smectite for Sticky Pacification; Ohtani, Sakamoto, Wakai; Proc. Pan–Pacific Pulp Pap. Tech. Conf. (Tokyo); pp. 105–110.
CA118(2):8521w Process for deinking wastepaper with organically modified Smectite clays; Cody, C. A., Magauran, E. D. (Rheox, Inc., USA) US 5151155 A, Sep. 21, 1992, 10 pages (Eng).
CA115(16):161507d Treatment of Water and Wastewater in paper manufacture; Ohtani, Y.; JP 03119190 A2 910521 Heisei, 5 pages (Japan).
CA115(16):161506c Treatment of white water for recycle in papermaking; Ootani, Y. (Nipponshi Pulp Kenkyusho K.K., Japan) JP03119189 A2 910521 Heisei, 5 pages.
CA101(14):112655c Removal of dissolved organic substance from paper mill white waters by adsorption on pigment like inorganic adsorbents. Moebius, C., Baumgarten, H.; 112 (11–12), 395–8,400–2,404–6 (Ger) 1984.
CA97(26);222401y Removing anionic compounds from water. Degen, Hans J; Guender, W.; Linhard, F.; Auhorn, W.; Frey, G.; Streit, W.; Fikentscher, R. (BASF A.G.) DE 3111615 A1 821007, 32 pages.
CA96(18):148580s Product and method for treating process and wastewater in papermaking and related industries. Moebius, Christian; Weigl, J.(Sued–Chemie A.G. Fed. Rep. Ger.)EP 44058 A1; Jan. 20, 1982; 21 pages.
CA81(4):16384m Effectivity of bentonite for the clarification of paper mill effluents; Brecht, W.; Boerner, F; Dalpke, H. L. (Inst. Papierfabr., Tech. Hochsch.Darmstadt; 28(3), 89–97 (Ger) 1974.
Paperchem No.: 64–03469 Copyright 1993 IPST Research for Developing Low–Waste Technology at UkrNIIB Svitel'skii, V. P. Bum.Promst.No. 8/9; 14–16 (Aug./Sep. 1991) Russ.
Paperchem No.: 56–07724 Copyright 1993 IPST Effectiveness of Using Clay Minerals for Purifying Paper Mill Effluent; Smetsinskii, B. F.; Svitel'skii, V. P.; Denisenko, N. G.; Tarasevich, Yu. I; Sb.Nauch.Tr.,Sovesh.Tekhnol.Proizvod. Tsellyul–Bumazh.:67–72 (1979 Kiev). Russ.
Paperchem No.:55–05540 Copyright 1993 IPST Elimination of Dissolved Organic Material from Paper Mill White Waters Mobius, C. H.; Baumgarten, H. L. Wochbl.Papierfabr.112,No.11/12 395–398,400–402,404–406 Jun. 15, 1984 (Ger.; Engl.sum.).
Paperchem No: 52 –11231 Copyright 1993 IPST Use of Clay/Polymer Treatment Vs. Alum in a Solids–Contact Clarifier for Mill Process Water; Carter, C. N.; Sigler, R. G., TAPPI Eng. Conf.(Atlanta) Proc.(Book 1) 229–235.
Paperchem No.: 49–02688 Copyright 1993 IPST Process for Purifying Aqueous Industrial Effluents (Ciba–Geigy AG) Brit.Pat.1,449,387,Iss. Feb. 1, 1978;Brit.Appln. 37616/75(Sep. 12, 1975).
Paperchem No. 45 –02696, Copyright 1993 IPST, Effectiveness of Bentonite in Clarifying Paper Mill Effluents; Brecht, W.; Borner, F.; Dalpke, H. L.; Papier 28, No. 3: 89–97 (Mar., 1974).
WPI 009221096 Removing water–based and oil–based inks from waste paper using novel de–inking agent comprising organically modified Smectite type clay; U.S. Pat. No. 5,151,155, Rheox Int. Inc. Cody, C. A.; Magauran, E. D.; Masgauran, E. D.
WPI 008208565 Additive for papermaking to improve retention of fines and fillers–comprises water–swellable smectite clay mineral; Mizusawa Chemical Ind.KK; JP 2047394, Feb. 16, 1990.
WPI 003452814 Purificn. of process and waste liquor from paper mfr. using acid–activated clay to remove dissolved and colloidal organic matter; Moebius, C.: Weigl, J. (Sud Chemie AG) EP 44058 Jan. 20, 1982.
WPI 008021928 Pulp Dewatering Process comprising adding a water soluble cationic polymer before shearing and bentonite or other inorganic material after shearing; EP 335576; Oct. 4, 1989.

*Primary Examiner*—Peter A. Hruskoci
*Attorney, Agent, or Firm*—Robert A. Miller; James J. Drake

[57] ABSTRACT

Hectorite is utilized in conjunction with a water soluble cationic coagulant to clarify waste water from the deinking of waste paper.

13 Claims, No Drawings

USE OF HECTORITE AS A CLARIFICATION AID FOR DEINK PLANT EFFLUENT

BACKGROUND OF THE INVENTION

This invention relates to the clarification of waste water formed as a result of the deinking of waste paper containing flexographic ink materials.

INTRODUCTION

Waste papers are being collected and recycled in increasingly larger amounts due to the cost of virgin wood pulp used to manufacture new paper, and the expense of disposing of increasingly larger amount of used paper products. Waste paper is typically reused by wet grinding and deinking the paper to recover a pulp, washing the pulp, and then reforming the pulp into new paper. When used paper that has been used is repulped, it is often difficult to remove inks present on the paper. These inks range from water based flexographic ink materials to xerographic toner particles. Numerous attempts have been made to deink waste paper. A typical deinking process for waste newsprint is illustrated in U.S. Pat. No. 4,666,558. In this reference, the waste newsprint is contacted and agitated in an aqueous medium containing certain water soluble surfactants, followed by separating the waste pulp from the waste water. Other deinking agents used in the industry include water insoluble organic esters, and combinations of these esters with organic particulate materials.

The resultant waste water from this process and others like it contains significant amounts of suspended particulates and soluble colored materials which must be removed prior to disposal of the water or its reuse. Waste waters of this type have typically been treated with a water soluble cationic coagulant polymer followed by treatment with a high molecular weight flocculant polymer which may be non-ionic, cationic or anionic. Waste waters of this type have also been treated by first adding bentonite clay followed by flocculant. Additional methods for treating deinking waste water are exemplified in U.S. Pat. No. 5,013,456 to St. John et al which teaches the use of a copolymer of diallyldimethyl ammonium chloride and acrylic acid as a coagulant treatment. Treatment of waste water by processes of this type have been relatively successful, but the choice of chemical treatment for such waste waters has remained somewhat variable due to the variable content of waste paper supplies.

We have discovered an improved process for the treatment of waste water originating from the deinking of waste paper. Our invention utilizes so called normal polymer treatments, but employs the addition of a hectorite clay to help remove suspended solids and color from waste water. Surprisingly, the hectorite clay of the invention provides improved performance over similar treatment programs which have utilized bentonite materials.

Objects of the Invention

It is therefore an object of this invention to provide to the art an improved method for the treatment of waste water from a paper-recycling operation. A further object of this invention is to provide to the art an improved method for the treatment of waste water from a waste paper deinking operation.

A still further object of this invention is to provide to the art a method for the clarification of waste water from a paper deinking operation which method utilizes a cationic coagulant, water soluble flocculant, and inorganic clay material. Further objects will appear hereinafter.

THE INVENTION

As stated earlier my invention relates to a method for the treatment of waste water from a paper deinking process wherein the waste water is treated to remove soluble colored impurities and particulates with a water soluble cationic coagulant followed by the application of a water soluble anionic flocculant. The improvement of this invention comprises adding to the waste water after the addition of flocculant, an effective amount of a hectorite clay followed by recovering a clarified waste water and a flocculated solid waste material.

The Waste Waters

The waste waters to be treated by the process of this invention are those arises from paper recycling operations. Typically, such waste waters arise as a result of the recycling of waste paper furnish comprising old magazines, old newspapers, mixed office waste (with and without laser/xerographic ink), mixed ledgers, and lightweight coated and uncoated board (foodboard). The waste water treated by the process of this invention generally contains solids ranging from 600 ppm total suspended solids to in excess of 2000 ppm of total suspended solids. In addition, the waste water may contain deinking additive residue including water soluble surfactants, inorganic particulate matter, so called collectors and water insoluble organic compounds, as well as suspended cellulosic materials that were not removed properly in the deinking/recycling process.

The cationic water soluble coagulant materials useful in this invention are typically condensation polymers of low to medium molecular weight, although certain low molecular weight vinyl addition polymers will also function in this capacity. Generally, materials meeting the requirements of the coagulant in this invention will have a molecular weight range of from several thousand to as high as 500,000. Preferably, the molecular weight of these materials will range from 10,000 to 250,000, and most preferably from 20,000 to 100,000. These materials include epichlorohydrin-dimethylamine and epichlorohydrin-dimethylamine-ammonia copolymers such as those exemplified in U.S. Reissue Pat. Nos. 28,807 and 28,808 to Panzer, ethylene dichloride dimethylamine and ethylene dichloride dimethylamine ammonia copolymers such as those described in U.S. Pat. Nos. 3,751,474 and 3,372,129, and polydiallyldimethyl ammonium chloride polymers which are exemplified in U.S. Pat. No. 2,926,161, all of which are hereinafter incorporated by reference into this specification.

In addition to the above mentioned polymer coagulants, other coagulants which may be used in the practice of this invention include low molecular weight copolymers of acrylamide with cationic vinyl addition monomers such as dimethylaminoethylmethacrylate, methacrylamidopropyltrimethyl ammonium chloride, dimethylaminoethylmethacrylate and its methyl chloride and methyl sulfate quaternary ammonium salts, and diallyldimethylammonium chloride. A suitable coagulant for use in this invention may be made by reacting a low molecular weight solution of polyacrylamide or a polyacrylamide with dimethylamine and formaldehyde such as that described in Suen U.S. Pat. No. 3,171,805. Other cationic coagulants and their synthesis will be apparent to those skilled in the art of solids-liquids separations. Preferred coagulants for use in this invention are epichlorohydrin-dimethylamine Copolymers such as those exemplified in U.S. Reissue Pat. Nos. 28,807 and 28,808.

The water soluble flocculants that may be used in this invention may be cationic, non-ionic or anionic. The flocculants of this invention typically have molecular weights in excess of 1,000,000 and will generally have molecular weights as high as 20–30 million. High molecular weight is often an advantage in materials of this type since they are believe by some to function by bridging individual suspended particles, and all that is important is that the flocculant be water soluble or dispersable in the aqueous waste water.

Typical cationic flocculants that may be employed in the practice of this invention include copolymers of acrylamide with various cationic monomers. These polymers include copolymers of acrylamide with such monomers as diallyldimethylammonium chloride, dimethylaminoethylmethacrylate and its quaternary ammonium salts, methylacrylamidotrimethylammonium chloride, and dimethylamino ethyl acrylate. These cationic flocculants should have a reduced specific viscosity of at least 3, and preferably the reduced specific viscosity should be in the range of 5 to 20 or more.

Typical non-ionic flocculant polymers that may be used in the practice of this invention include polyacrylamide, and polymethacrylamide. In addition, certain naturally occurring high molecular weight non-ionic polymers, such as polysaccharides like dextran and starch may be employed.

Typical anionic flocculant materials that may be used in the practice of this invention include copolymers of acrylamide with acrylic or methacrylic acid, acrylamidomethylpropane sulfonic acid, and other commercially available water soluble monomers having carboxylic acid, sulfonate, phosphonate or hydroxyl functionality. Generally, although not critical in this invention, the anionic flocculant polymers will contain as little as 1 weight percent anionic character or as much as 100 weight percent anionic character. Preferably, the anionic flocculants of this invention will have an anion character of from 20 to 80 weight percent. By anionic character is meant the weight percent of a monomer having artionic functionality in the completed polymer. A preferred anionic flocculant material, when one is employed is polyacrylic acid having a molecular weight greater than 10,000,000.

The hectorite clay of this invention should be largely hectorite and contain a minimal amount of other naturally occurring clay materials such as bentonite. Hectorite clays are commercially available from a variety of sources, and may be a so called naturally occurring hectorite, or synthetic hectorite such as that available under the trade name DAC-3 from Delta Chemical Company. This synthetic hectorite material is believed to have a particle size of 1–5nm thickness and 250–500nm width. Particularly preferred materials for use in the practice of this invention are synthetic hectorite clays such as those described in U.S. Pat. No. 3,586,478 to Neumann which is hereinafter incorporated by reference into this specification. Hectorite is defined in the Merck Index, Eleventh addition as a "Swelling and gelling clay of the montmorillonite group. Approx Form: $Na_{0.67}(Mg,Li)_6Si_8O_{20}(OH,F)_4$." Bentonite clay, used in the prior art is defined by the same reference as "A colloidal native hydrated aluminum silicate (clay) found in the midwest of the U.S.A. and in Canada. Consists principally of montmorillonite, $Al_2O_3.4SiO_2.H_2O$." Since both bentonite and hectorite are of the montmorillonite family, it is particularly surprising that hectorite give superior results over bentonite.

The preferred hectorite material for use in this invention is defined by its manufacturer as a sodium magnesium silicate having the formula $MgSi_4O_{10}Na$.

The Process

In the Process of the instant invention, waste water from a deinking/recycling unit is pumped to a holding tank or clarifier. To the waste water is then added an effective amount of the cationic coagulant polymer. The amount of cationic coagulant added is generally sufficient to neutralize the negative charge of particles suspended in the waste water. After the coagulant has been added, and mixed with the waste water, the flocculant is added to the system. Next, the finely divided hectorite clay of the invention is added to the system, and the system although the clay may be added ahead of the flocculant as well, and the system is slowly mixed, allowing the flocculated material to settle. Lastly, sufficient flocculant is added to cause the formation of large floc of particles which may be conveniently removed. Alternatively, the process may be carried out in a so called dissolved air flotation unit where tiny air bubbles are introduced into the system at the bottom, and the resultant flocculated materials are floated and then decanted from the waste water.

Equipment such as clarifiers and dissolved air flotation units (DAF's) utilized to perform the solids/liquid removal step in this invention are conventional and well known to those skilled in the art. While it is a preferred embodiment of this invention that the hectorite clay of the invention be added to the waste water after the low molecular weight cationic coagulant polymer, the clay may be added prior to the addition of the coagulant polymer, or alternatively may be mixed with the cationic polymer prior to addition to the waste water. We do not believe that the order of addition of the coagulant and clay is critical, but do prefer the addition of the clay to the waste water after the coagulant has been added and mixed as a practical matter.

Since coagulation is generally regarded as a charge neutralization step, the amount of water soluble cationic coagulant should be sufficient to neutralize substantially all of the negatively charged particles in the waste water. The optimum effective dosage may be found by routine experimentation, or, sophisticated charge measurement devices may be employed. Typically, the coagulant is added to the system at a level of from 1 ppm to 100 ppm (as polymer) and preferably from 1 ppm to 100 ppm based on the total amount of waste water.

The dosage of the hectorite clay of this invention may also be determined through simple experimentation by dosing samples of waste water previously treated with an optimum dosage of coagulant with differing dosages of clay until an optimum effective dosage of clay is determined. Typical dosages of hectorite day generally range from 1 ppm to 200 ppm based on the total weight of the waste water and preferably from 5 ppm to 50 ppm.

The dosage of the high molecular weight anionic flocculant material may also be determined through simple experimentation in so called bottle tests by dosing samples of waste water previously treated with optimum dosages of cationic coagulant polymer and hectorite clay with differing dosages of the flocculant until an optimum effective dosage of the flocculant is determined. Typical dosages of high molecular weight water soluble flocculant generally range from 1 ppm to 100 ppm (as polymer) based on the total weight of the waste water and preferably from 2 ppm to 50 ppm.

In order to evaluate the benefits of this invention, the following examples were performed.

EXAMPLE 1

Experimental work was undertaken to determine the effect of the hectorite clay additive of this invention in the clarification of waste water from a paper mill in the northwestern portion of the United States. Twelve samples of waste water were obtained. These samples differed in content relative to flexographic furnish present in the waste paper originally treated, chemicals utilized in the deinking process, suspended solids, and charge. These waste water samples are identified below as runs A-H in Table 1, below.

TABLE 1

| Sample | % Flexo furnish | collector[1] | charge | solids (ppm) |
|---|---|---|---|---|
| A | 0 | no | −235 | 940 |
| B | 10 | no | −265 | 860 |
| C | 20 | no | −310 | 880 |
| D | 0 | yes | −260 | 950 |
| E | 10 | yes | −275 | 640 |
| F | 20 | yes | −310 | 660 |
| G | 0 | no | −227 | 1040 |
| H | 0 | no | −205 | 1836 |

[1]collector used was Hart Tm 720 at 0.1% total furnish In each case, the furnish makeup contained 1.5 weight percent NaOH (50%); 0.35% Lionsurf 727 believed to be a ethoxylated phenol type, material; 1.0% hydrogen peroxide; 0.2% diethylenetriaminepentacetic acid; 1.0% sodium silicate. pH of effluent was 8.6–8.8.

The first set of deinking runs was done on runs A-F. These laboratory deinking studies were done about 10 days prior to conducting the treatment of the waste water resulting from the experiments. Tap water was used for the pulper dilution. Runs G-K were done using actual water from a paper mill, and deinking was immediately followed by clarification.

Run L was done using tap water and was deinked about 3 days prior to waste water treatment studies.

After repulping the samples, the materials were put through various screens to remove pulp, and recover the waste water for further testing. Runs A-G were run through a 60 mesh screen, Runs G and I through a 48 mesh screen, and runs H and J through a 12 mesh screen. Cationic demand was determined using a Mutek instrument, available from Mutek GmbH. A manual titration method was used to verify readings from the Mutek instrument.

Results of experiments on the clarification of waste waters generated from the deinking experiments described above are found in Table 2.

In Table 2, The Polymer designated "EPI-DMA" was a 51.5% by weight epichlorohydrin/dimethylamine copolymer having an approximate molecular weight of 20,000 as determined by size exclusion chromatography.

Additive X was a commercially available high molecular weight copolymer flocculant of acrylamide and acrylic acid in water-in-oil emulsion form.

Additive Y was a commercially available high molecular weight copolymer of acrylamide and diallyldimethyl ammonium chloride in water-in-oil emulsion form.

Additive B was a 1% dispersion of dry bentonite clay made on site; Additive C was a 8% aqueous slurry of bentonite including 0.05% by weight of an acrylic acid methylacrylate copolymer dispersant diluted to 1% by weight bentonite for use.

Additive D was a dispersion of 40 weight percent dry bentonite clay in 60 weight percent Polymer EPI-DMA.

Additive "HC" is DAC-3 available from the Delta Chemical Company, a synthetic hectorite clay.

In Table 2 below all dosage numbers reflect parts per million (ppm) to the waste water being tested.

TABLE 2

| Additive 1 | Additive 2 | Additive 3 | % T | Solids (ppm) | Charge |
|---|---|---|---|---|---|
| WASTE WATER A (0% flexo, 940 ppm solids, no collector, 10 days old) | | | | | |
| 0 | 0 | 0 | 8 | | |
| 60 EPI-DMA | 5 X | 0 | 38 | | |
| 70 EPI-DMA | 5 X | 0 | 39 | | |
| 80 EPI-DMA | 5 X | 0 | 38 | | |
| 90 EPI-DMA | 5 X | 0 | 37 | 80 | |
| 70 D | 5 X | 0 | 37 | | |
| 90 D | 5 X | | 41 | | |
| 70 EPI-DMA | 5 Y | | 27 | | |
| 90 EPI-DMA | 5 Y | | 32 | | |
| 90 D | 10 X | | 51 | | |
| 90 D | 15 X | | 54 | | |
| 120 D | 10 X | | 49 | | |
| 120 EPI-DMA | 10 X | | 39 | | |
| 80 EPI-DMA | 30 B | 10 X | 54 | | |
| 80 EPI-DMA | 80 B | 10 X | 63 | 40 | |
| 70 Y | 10 X | | 19 | | |
| 100 Y | 10 X | | 25 | | |
| Waste Water B (10% flexo, 860 ppm solids, no collector, 10 days old) | | | | | |
| 80 EPI-DMA | | 10 X | 40 | | |
| 80 EPI-DMA | 80 B | 10 X | 69 | | 17 |
| | 80 B | 10 X | 18 | | |
| 80 B | 80 EPIDMA | 10 X | 59 | | |
| | 10 X | 80 B | 18 | | |
| 80 B | | 10 X | 42 | | |
| 80 EPI-DMA | 30 B | 10 X | 56 | | |
| 90 EPI-DMA | 90 B | 10 X | 80 | | 17 |
| Waste Water C (20% flexo, 880 solids, with collector, 10 days old) | | | | | |

TABLE 2-continued

| Additive 1 | Additive 2 | Additive 3 | % T | Solids (ppm) | Charge |
|---|---|---|---|---|---|
| 80 EPI-DMA | | 10 X | 31 | | |
| 80 EPI-DMA | 30 B | 10 X | 47 | | |
| 80 EPI-DMA | 80 B | 10 X | 61 | 20 | |
| 90 EPI-DMA | 90 B | 10 X | 70 | | |
| 80 EPI-DMA | 10 HC | 10 X | 74 | | |
| 80 EPI-DMA | 30 HC | 10 X | 93 | <10 | |
| 80 EPI-DMA | 50 HC | 10 X | 92 | | |
| 80 EPI-DMA | 70 HC | 10 X | 74 | | |
| Waste Water D (0% flexo, 950 ppm solids, with collector) | | | | | |
| 80 EPI-DMA | 80 D | 10 X | | | |
| 80 EPI-DMA | 80 B | 10 X | 84 | | |
| 80 EPI-DMA | 80 HC | 10 X | 96 | <10 | |
| 80 EPI-DMA | 80 C | 10 X | 79 | | |
| 80 D | | 10 X | 36 | | |
| 80 EPI-DMA | 80 HC | 10 X | 93 | | |
| 80 EPI-DMA | | 10 X | 52 | | |
| 80 EPI-DMA | 10 HC | 10 X | 79 | | |
| 80 EPI-DMA | 30 HC | 10 X | 94 | | |
| 80 EPI-DMA | 50 HC | 10 X | 96 | | |
| 80 EPI-DMA | 70 HC | 10 X | 93 | | |
| Waste Water E (10% flexo, 640 ppm solids, with collector, 10 days old) | | | | | |
| 80 D | | 10 X | 31 | | |
| 80 EPI-DMA | 80 B | 10 X | 85 | | |
| 80 EPI-DMA | | 10 X | 35 | | |
| 80 EPI-DMA | 80 C | 10 X | 73 | | |
| 80 EPI-DMA | 10 HC | 10 X | 72 | | |
| 80 EPI-DMA | 30 HC | 10 X | 90 | | |
| 80 EPI-DMA | 50 HC | 10 X | 99 | | |
| 80 EPI-DMA | 70 HC | 10 X | 96 | | |
| Waste Water F (20% flexo, 660 ppm solids, with collector, 10 days old) | | | | | |
| 80 EPIDMA | | 10 X | 34 | | |
| 80 EPIDMA | 30 B | 10 X | 55 | | |
| 80 EPIDMA | 80 B | | 73 | | |
| 90 EPIDMA | 90 B | 10 X | 80 | <10 | |
| Waste Water G (0% flexo, 1040 ppm solids, no collector, 1 hour old) | | | | | |
| 50 EPI-DMA | | 10 X | 74 | <10 ppm | −.015 |
| 80 EPI-DMA | | 10 X | 71 | | +.010 |
| 90 EPI-DMA | | 10 X | 69 | | |
| 70 EPI-DMA | | 05 X | 72 | | |
| 30 EPI-DMA | | 05 X | 45 | 13 | −.05 |
| 40 EPI-DMA | | 05 X | 64 | | |
| 50 EPI-DMA | | 05 X | 71 | | |
| 60 EPI-DMA | | 05 X | 72 | | |
| 50 EPI-DMA | 30 HC | 05 X | 93 | | |
| 83 D | | 05 X | 54 | | |
| 0 | 0 | 0 | 08 | | −.227 |
| Waste Water H (0% flexo, 1836 ppm solids, no collector, 2 hours old) | | | | | |
| 30 EPI-DMA | | 05 X | 52 | <10 | |
| 40 EPI-DMA | | 05 X | 72 | | |
| 50 EPI-DMA | | 05 X | 78 | | −.015 |
| 60 EPI-DMA | | 05 X | 83 | | |
| 40 EPI-DMA | 05 HC | 05 X | 77 | | |
| 40 EPI-DMA | 10 HC | 05 X | 85 | | |
| 40 EPI-DMA | 15 HC | 05 X | 89 | | |
| 40 EPI-DMA | 20 HC | 05 X | 87 | | −.025 |
| 0 | 0 | 0 | 9 | | −.205 |

From the above results, viewing percent transmittance as an indication of the efficiency of the clarification process, the process employing the low molecular weight polymer, synthetic hectorite clay and high molecular weight flocculant gave the best results. In addition the data shows that the dual polymer treatment employing hectorite, also significantly outperformed the dual polymer program when bentonite clay was substituted for the hectorite. We believe that this data substantiates the unexpected results achieved in the use of Hectorite clay for the treatment of deink plant effluent.

Having described our invention, we claim:

1. A method for the treatment of waste water from a paper deinking process to remove soluble colored impurities and particulates comprising:

a. adding a water soluble cationic polymer coagulant to the waste water in an effective amount to neutralize negatively charged particles in said waste water, wherein said coagulant has a molecular weight of less than or equal to about 500,000.

b. after the addition of the coagulant, adding a water soluble anionic polymer flocculant in an effective amount to flocculate said impurities and particulates, wherein said flocculant has a molecular weight of at least about 1,000,000, c. adding at least 1 ppm of hectorite clay; and then, d. recovering a clarified waste water and a flocculated solid waste material containing flocculated soluble colored impurities and particulates utilizing a clarifier or a dissolved air flotation unit.

2. The method of claim 1 wherein the water soluble cationic coagulant is a copolymer of epichlorohydrin and dimethylamine and the water soluble flocculant is a copolymer of acrylamide and acrylic acid.

3. The method of claim 2 wherein the epichlorohydrin-dimethylamine copolymer has a molecular weight of from 5,000 to 100,000.

4. A method for the clarification of waste water containing soluble colored impurities, particulates, and flexographic inks from a paper deinking process to remove such colored impurities, particulates, and flexographic inks comprising:

a. adding a cationic water soluble polymer coagulant to the waste water in an effective amount to neutralize negatively charged particles in said waste water, wherein said coagulant has a molecular weight of less than or equal to about 500,000;

b. after the addition of the coagulant adding a water soluble anionic polymer flocculant in an effective amount to flocculate said impurities, particulates, and flexographic inks, wherein said flocculant has a molecular weight of at least about 1,000,000;

c. adding from 1 ppm to 200 ppm based on the weight of the waste water of a hectorite clay; and then, d. recovering a clarified waste water and a flocculated solid waste material containing flocculated soluble colored impurities, particulates, and flexographic inks utilizing a clarifier or a dissolved air flotation unit;

5. The method of claim 4 wherein the cationic water soluble polymer coagulant is a condensation polymer having a molecular weight of from 5,000 to 500,000.

6. The method of claim 4 wherein the anionic water soluble flocculant is an acrylamide copolymer.

7. The method of claim 4 wherein the water soluble polymer coagulant is a condensation polymer of epichlorohydrin and dimethylamine.

8. A method for the treatment of waste water from a paper deinking process to remove suspended solids and soluble colored materials comprising;

a. adding a water soluble cationic polymer coagulant to the waste water in an effective amount to neutralize negatively charged particles in said waste water, wherein said coagulant has a molecular weight of less than or equal to about 500,000;

b. after the addition of the coagulant, adding a water soluble anionic polymer flocculant in an effective amount to flocculate said suspended solids and colored materials, wherein said flocculant has a molecular weight of at least about 1,000,000;

c. adding at least 1 ppm of a hectorite clay; and then, d. recovering a clarified waste water having reduced amounts of suspended solids and soluble colored materials utilizing a clarifier or a dissolved air flotation unit.

9. The method of claim 8 wherein the water soluble cationic coagulant is a condensation polymer having a molecular weight of from 5,000 to 500,000.

10. The method of claim 8 wherein the anionic flocculant is an acrylamide polymer.

11. The method of claim 8 wherein the water soluble polymer coagulant is a condensation polymer of epichlorohydrin and dimethylamine.

12. The method of claim 8 wherein the hectorite is added at a dosage of from 1–200 ppm based on the total weight of the waste water.

13. The method of claim 8 wherein the hectorite is added at a dosage of from 5–50 ppm based on the weight of the waste water.

* * * * *